United States Patent Office 3,129,250
Patented Apr. 14, 1964

3,129,250
THE PRODUCT PREPARED BY REACTING ACETYLENE WITH TRIFLUOROETHANOL
Francis E. Lawlor, Wyndmoor, and Milton Braid, Philadelphia, Pa., and John T. Barr, Needham, Mass., assignors to Pennsalt Chemicals Corporation, a corporation of Pennsylvania
No Drawing. Filed Nov. 27, 1956, Ser. No. 624,521
1 Claim. (Cl. 260—615)

This invention relates to a method for preparation of fluorinated alkyl vinyl ethers. Particularly it relates to a catalytic process for thermally cracking a polyfluoroalkyl acetal to a fluorinated alkyl vinyl ether. More particularly it relates to a method for the preparation of 2,2,2-trifluoroethyl vinyl ether.

It is known in the art that non-fluorinated alkyl vinyl ethers can be made by thermally dealcoholating an acetal at high temperature to form an alkyl vinyl ether by use of a catalyst comprising refined precious metals, e.g., gold, silver and platinum as well as less precious refined metals, e.g., copper, magnesium, calcium, zinc, tin, thorium and manganese, or their oxides or salts, deposited in finely-divided form on a carrier stable at elevated temperatures, e.g., asbestos, mica, silica, activated carbon, and so on.

U.S. 1,931,858, for example, teaches the preparation of vinyl ethers by the pyrolysis of acetals in the presence of catalysts and carriers of the above-mentioned type. The same prior art method has been found successful for the cracking of polyfluoroalkyl acetals to fluoroalkyl vinyl ethers. Other methods for preparation of ethers from acetals are disclosed in British Patents 681,059 and 742,083. British Patent 681,059 discloses and claims a method whereby dialkyl ethers in which one of the alkyl groups is unsaturated are obtained by the catalytic dealcoholysis of dialkyl acetals by a process in which the acetals are maintained at an elevated temperature in the presence of a catalyst comprising barium oxide deposited on silica gel maintained in a fluidized state. British Patent 742,083 discloses and claims a process of producing fluoroalkyl vinyl ethers by reacting a fluoroalkanol with acetylene at an elevated temperature and under pressure in the presence of a corresponding alkali metal fluoroalkanolate.

We have now found that polyfluoroalkyl acetals can be thermally cracked in the absence of the deposited refined metals or metal oxides or salts required in the prior art by using as catalyst an inexpensive siliceous compound, for example, mica, asbestos or silica, and preferably expanded vermiculite. The economic significance of this discovery will be appreciated by those familiar with the art.

The refined-metal-type and other deposited-type catalysts may be used successfully for the cracking of both fluorinated and non-fluorinated alkyl acetals; the catalyst of this invention works successfully only with the fluorinated alkyl acetals. Consequently, for the cracking of the fluorinated alkyl acetals use of the catalyst and method of our invention is economically advantageous. Savings result through lowered catalyst and catalyst preparation costs. Savings in time are also obtained through elimination of the preparation, recovery and deposition operations involved when using finely divided metals, metal salts or oxides.

Additionally, we have found that the use of a decomposition inhibitor in the reaction mixture during the carrying out of the process of our invention is helpful in increasing yield of product by preventing decomposition of the newly formed fluoroalkyl vinyl ether to hydrofluoric acid and undesirable byproducts.

The polyfluoroalkyl acetals employed in the process of this invention are those having the structure

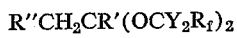

in which R' and R" are selected from the group consisting of hydrogen, alkyl with 1 to 12 carbon atoms and substituted alkyl with 1 to 12 carbon atoms in which the substituents are selected from the group consisting of fluoroalkoxy, aryl, arylalkyl, alkylaryl, cyanogen and halogen; Y is hydrogen or methyl; $R_f$ is selected from the group consisting of fluoroalkyl and chlorofluoroalkyl, with 1 to 12 carbon atoms, for example, perfluoromethyl, perfluoroethyl, perfluoropropyl, perfluorobutyl, perfluoropentyl, perfluorohexyl, and other perfluoroalkyls through perfluorododecyl, fluoromethyl, difluoromethyl, 2,2,2-trifluoroethyl, 1,2,2,2-tetrafluoropropyl, 1,1,2,2,2-pentafluoropropyl, chlorodifluoromethyl, fluorodichloromethyl, 1-chloro-1,2,2,2-tetrafluoroethyl; and R', R" and $R_f$ taken collectively contain not more than 26 carbon atoms.

The fluorinated alkyl vinyl ethers to which this invention pertains are represented by the structural formula

in which R", R' and $R_f$ are the same as defined above.

Examples of such fluorinated alkyl vinyl ethers are 2,2,2-trifluoroethyl vinyl ether,
2,2,2-trifluoro-1-methylethyl vinyl ether,
2,2,2-trifluoroethyl-2-methylvinyl ether,
2,2,3,3,4,4,5,5,5-nonafluoropentyl vinyl ether,
2,2,2-trifluoroethyl-2'-cyanovinyl ether,
2,2,3,3,4,4,4-heptafluorobutyl-2'-phenylvinyl ether,
and the like.

Fluorinated vinyl ethers are known valuable compounds. Of these the 2,2,2-trifluoroethyl vinyl ether is of special importance as an anesthetic which is relatively resistant to explosion compared to other commonly employed inhalant anesthetics. Monomeric fluorinated vinyl ethers can be polymerized into valuable polymeric compounds and into copolymers with a wide variety of olefins, e.g., vinyl chloride, vinyl acetate, styrene, etc. For example, co-pending applications Serial No. 518,929 and now Patent No. 3,025,279, and 518,930 and now abandoned, both filed June 29, 1955, and 537,292 filed September 28, 1955, and now Patent No. 2,813,848, disclose and claim copolymers of 2,2,2-trifluoroethyl vinyl ether with 2,2,2-trifluoroethyl acrylate, perfluorobutadiene, and 1-chloro-2,2-difluoroethylene, respectively.

In the practice of this invention a polyfluoroalkyl acetal with the structural formula

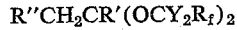

in which R", R', $R_f$ and Y are the same as defined above, is thermally dealcoholated by passing the acetal at an elevated temperature over a catalyst consisting of a siliceous compound free of a separate deposited catalyst material, thus cracking the acetal to form the desired fluoroalkyl vinyl ether. For optimum yield of the ether, a small amount of a decomposition inhibitor consisting of a tertiary nitrogen compound, preferably one selected from the group consisting of pyridine and tertiary alkyl amines, may be introduced into the reactor by mixing it into the acetal fed to the reactor.

The reaction involved may be represented by the following equation:

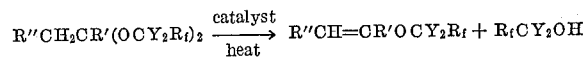

in which R", R', $R_f$ and Y are the same as defined above.

In a preferred embodiment of this invention 2,2,2-trifluoroethyl vinyl ether is prepared by subjecting bis(2,2,2-trifluoroethyl) acetal to thermal cracking at a temperature in the range from about 200° C. to just below the decomposition temperature of the products, by passing the vaporized mixture over a siliceous catalyst, preferably expanded vermiculite, free from a separate deposited catalyst material, and recovering 2,2,2-trifluoroethyl vinyl ether from the reaction products, preferably by fractional distillation. The bis(2,2,2-trifluoroethyl) acetal which is used may be prepared by reacting 2,2,2-trifluoroethanol with acetylene in the presence of an acid mercuric catalyst using procedures known in the art. The decomposition temperature varies depending on the acetal being cracked. It can be readily determined by a trial run.

The polyfluoroalkyl acetals used in the preparation of the fluoroalkyl vinyl ethers by the method described and using the catalysts of this invention may be derived from any source. In general, the $R_fCY_2O-$ portion of the fluoroalkyl vinyl ether structure may be derived from a polyfluoroalkanol having the structural formula $$R_fCY_2OH$$

in which $R_f$ and Y are the same as defined above. The $-CR'=CHR''$ portion of the ether formula may be derived from an acetylene having the structural formula $R'C\equiv CR$, in which $R'$ and $R''$ are the same as defined above. The polyfluoroalkanol and the acetylene combine to form a polyfluoroacetal having the structural formula $R''CH_2CR'(OCY_2R_f)_2$, which is then thermally cracked, or dealcoholated, over a catalyst to form the fluoroalkyl vinyl ether.

Polyfluoroalkanols which can be reacted with acetylenes to prepare the polyfluoroalkylacetals which are cracked in the practice of this invention include 2,2,2-trifluoroethanol, 2,2,2-trifluoro-1-methylethanol, 2,2,3,3,4,4,5,5,5-nonafluoropentanol, 2,2,3,3,3-pentafluoropropanol, 2,2,3,3, 4,4,4-heptafluoro-1,1-dimethylbutanol, and the like.

Acetylenes which can be reacted with the polyfluoroalkanols to prepare the polyfluoroalkylacetals include acetylene, propyne, 1-butyne, 2-butyne, ethynylbenzene 1-nonyne, 3-hexyne and the like.

The process of this invention thus provides a new and convenient method for the preparation of a large variety of fluoroalkyl vinyl ethers.

The purity of a polyfluoroalkyl acetal which is used in the cracking is not critical to the successful practice of this invention, since in the absence of deposited refined metals problems of catalyst poisoning from minor amounts of contaminants cannot occur. For example, bis(2,2,2-trifluoroethyl) acetal prepared from industrially pure welding grade acetylene, sold under the brand name Prestolite and scrubbed only with water and sulfuric acid, was found suitable for preparing 2,2,2-trifluoroethyl vinyl ether by using the catalyst materials of this invention.

The catalyst found useful for the practice of this invention is a material from the class of materials commonly known in the art as carriers for catalytic materials. The most valuable of the carrier type materials for use in this invention are siliceous compounds low in activated alumina and selected from the group consisting of mica, asbestos, silica, and ashes from silica-containing compounds low in activated alumina content. The most preferred catalyst is expanded vermiculite, a form of mica. In each case the carrier type material is used free of a separate deposited catalyst material. Each catalyst of our invention may be used individually or in combination with one or more of the others in the group defined above.

The bulk size of the particles of the catalyst used is preferably 2 to 4 mesh, but may range in size from very fine particles passing a 300 mesh U.S. Standard sieve to lumps up to 2 inches in cross-section.

The catalyst material used for the thermal cracking must be low in, and preferably free of, activated alumina content. The presence of more than about 5% of activated aluminum oxide has been found to have an adverse effect on the conversion of the polyfluoroalkyl acetal to the corresponding fluoroalkyl vinyl ether. For example, attempted use of activated alumina alone as a thermal cracking catalyst at 280° C. for the preparation of 2,2,2-trifluoroethyl vinyl ether resulted in decomposition of the 2,2,2-trifluoroethyl acetal used; no 2,2,2-trifluoroethyl vinyl ether was produced. Non-activated alumina which is present in the structure of mica and of asbestos compounds does not show this adverse effect.

Mica is a general name applied to a number of varieties of this siliceous mineral. Among the micas useful for the practice of this invention are the common types, of which the following are some examples: muscovite, a potash silicate mica, $H_2KAl_3(SiO_4)_3$; phlogopite, a magnesium mica, $(H, K, Mg, F)_3MgAl(SiO_4)_3$; biotite, magnesium iron mica, $(H, K)_2(Mg, Fe)_2Al_2(SiO_4)_3$; margarite, a calcium mica, $CaO(SiO_2)_2.(Al_2O_3).H_2O$; roscoelite, a vanadium mica, $H_8K(Mg, Fe)(Al, V)_4(SiO_3)_{12}$; lepidolite, a lithium mica, $K, Li(Al(OH), F)_2)Al(SiO_3)_3$; and expanded vermiculite, an alteration of biotite and other micas, $(H, K)_2(Mg, Fe)_2Al_2(SiO_4)_3$. The expanded vermiculite is preferred because of its effectiveness, availability and low cost.

Asbestos is a general name applied to a number of fibrous mineral silicates. The chemical compositions of these vary from simple to complex silicates. Among the asbestos compounds useful for the practice of this invention are the common types, of which the following are typical examples: chrysotile, a hydrated magnesium silicate, $2SIO_2.3MgO.2H_2O$; anthrophyllite, a magnesium iron silicate, $7 MgO, FeO).8SiO_2.H_2O$; amosite, also a ferro-magnesium silicate but with iron content higher than that of anthrophyllite $(FeO, MgO)SiO_2$; crocidolite, a sodium iron silicate, $Na_2O.3FeO.Fe_2O_3.8SiO_2.H_2O$; tremolite, a calcium magnesium silicate, $$2CaO.5MgO.8SiO_2.H_2O$$

and actionolite, a calcium magnesium iron silicate, $Ca(MgFe)_3(SiO_3)_4$. The common chrysotile asbestos is the preferred form.

Among the silicas useful in the practice of this invention are the natural forms of silica, e.g., quartz, tridymite, flint, chert, chalcedony, agate, opal, and sands and sandstones. Talc, $MgSi_4O_{10}(OH)_2$, can also be used. Ordinary quartz sand is the preferred form. Activated carbon, prepared by carbonizing animal or plant matter, and which thus contains siliceous mineral ashes, has also been found useful.

The siliceous compound used as the catalyst for the thermal cracking of the polyfluoroalkyl acetal to the fluoroalkyl vinyl ether needs no special preparation other than to insure its being in a dry state and conveniently sized.

For use as decomposition inhibitors, basic organic nitrogen compounds containing tertiary nitrogen, preferably compounds selected from the group consisting of pyridine, homologues of pyridine and tertiary alkyl amines have been found useful. These include 2-picoline, 3-picoline, 4-picoline, and the higher substituted pyridines, such as the dimethyl-, trimethyl- and tetramethylpyridines, tert-ethyl-, tert-propyl-, tert-butyl-, tert-amyl-, tert-hexylamines, and so on.

Pyridine has been found especially useful and is the preferred decomposition inhibitor for practice of the dealcoholation step of this invention. A quantity of decomposition inhibitor amounting to about from 0.5% to about 5%, and preferably about 2%, by weight of the charge of the reactant mixture to the cracking tower may be used. The inhibitor is recovered with the effluent from the reactor and can be recycled to the reactor after separation from the fluoroalkyl vinyl ether.

Thermal cracking of the polyfluoroalkyl acetal to the fluoroalkyl vinyl ether can be carried out in the types of catalytic cracking towers known to the art. These include ordinary packed towers, tubular packed towers and moving bed reactors with appropriate heating facilities.

The cracking can be carried out in the temperature range from about 200° C. to just below the decomposition temperature of the product, which may be about 500° C. A temperature range of from about 250 to about 350° C. is preferred.

The polyfluoroalkyl acetal is vaporized and passed through the heated tower reactor containing the cracking catalyst. The throughput is at the rate of about 30 to about 40 pounds per cubic foot of reactor volume per hour. The higher rate is preferred.

The effluent from the cracking tower is cooled and separated, fractional distillation being preferred for the separation, to recover the fluoroalkyl vinyl ether from the reaction products. The recovered by-product polyfluoroalkanol may be used in the preparation of more polyfluoroalkyl acetal.

The following examples are presented for the purpose of illustrating the invention, it being understood that the invention is not intended to be restricted to the specific illustrative examples and that other specific modifications are included in the invention. The parts are by weight unless otherwise stated.

EXAMPLE 1

*Preparation of Bis(2,2,2-Trifluoroethyl) Acetal*

550 parts of 2,2,2-trifluoroethanol, 35 parts of concentrated sulfuric acid and 10 parts of yellow mercuric oxide were placed in a reactor equipped with stirrer, thermometer well, gas inlet tube and reflux condenser. Commercial Prestolite acetylene was passed through a water-filled scrubber into two sulfuric-acid filled scrubbers and then into the stirred mixture as rapidly as absorption took place. The temperature of the reaction mixture was maintained at 30–40° C. by means of external cooling. When absorption of acetylene and the evolution of heat from the reaction had ceased, the reaction mixture was steam-distilled. The organic layer of the distillate was separated, dried and redistilled. The fraction boiling from 110 to 120° C. was identified as bis(2,2,2-trifluoroethyl) acetal and represented 57% of the charge to the still.

The fraction boiling at 190–195° C. represented about 3% of the charge to the still. It was identified as an acetal with the empirical formula $C_{10}H_{13}F_9O_3$, a new composition of matter. Analysis of the compound $C_{10}H_{13}F_9O_3$ gave C=34.0 (theory, 34.1); H=3.9 (theory, 3.7); F=47.5 (theory, 47.6); O=14.6 (theory, 14.6); molecular weight=334, cryoscopic in dioxane (theory 352); $d\ 25/4$=1.0051; $N_d^{22}$=1.3371. Analysis of the acetal by infra-red spectroscopy indicated the presence of at least one methyl group. The probable structure of the compound $C_{10}H_{13}F_9O_3$ is believed to be

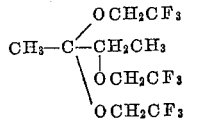

Other possible structures are

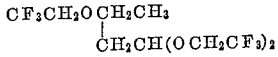

and

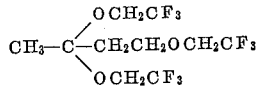

$C_{10}H_{13}F_9O_3$, as shown in Example 3, is useful for the preparation of 2,2,2-trifluoroethanol and a fluorinated alkyl vinyl ether. Also, it is useful as a coupling agent for the formation of emulsions, suspensions and solutions of highly fluorinated compounds with non-fluorinated compounds. For example, amyl alcohol and perfluoromethyl cyclohexane are made miscible by adding

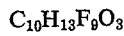

to the mixture.

EXAMPLE 2

*Cracking of Bis(2,2,2-Trifluoroethyl) Acetal Using Asbestos Catalyst*

A 25 mm. I.D. glass tube was packed for a 65 cm. length with a 2 to 4 mesh size of shredded domestic asbestos. The tube and its contents were heated to 300–335° C. 115 grams of bis(2,2,2-trifluoroethyl) acetal mixed with 2 grams of pyridine were passed through the tube during a period of 65 minutes. A conversion of 89.2% of the acetal to fractions boiling below 100° C. and containing the 2,2,2-trifluoroethyl vinyl ether product was obtained. The yield of 2,2,2-trifluoroethyl vinyl ether was 93.5%.

EXAMPLE 3

*Cracking of $C_{10}H_{13}F_9O_3$*

79 parts of $C_{10}H_{13}F_9O_3$, prepared as in Example 1, were mixed with 1.35 parts of pyridine and passed in 1.4 hours over shredded domestic asbestos at 340° C. using the apparatus of Example 2. The condensed effluent was fractionated. 34 parts of 2,2,2-trifluoroethanol and 45 parts of a fluorinated alkyl vinyl ether were obtained.

EXAMPLE 4

*Cracking of Bis(2,2,2-Trifluoroethyl) Acetal Using Mica Catalyst*

117 parts of bis(2,2,2-trifluoroethyl) acetal were passed through the apparatus of Example 2 at 235 to 340° C. using expanded vermiculite as the catalyst. The condensed effluent was distilled into three fractions with recovery shown:

| Fraction | Temp., ° C. | Parts |
|---|---|---|
| 2,2,2-trifluoroethyl vinyl ether | 0–60 | 65 |
| 2,2,2-trifluoroethanol | 61–100 | 45 |
| bis(2,2,2-trifluoroethyl) acetal | 101–115 | 5 |

The conversion of bis(2,2,2-trifluoroethyl) acetal was 96%. The yield of 2,2,2-trifluoroethyl vinyl ether was about 100% of the theoretical.

EXAMPLE 5

Under conditions similar to those described in Example 1, propyne (CH≡CCH₃) is reacted with 2,2,3,3,3-pentafluoropropanol (CF₃CF₂CH₂OH) in the presence of sulfuric acid and mercuric oxide to form the polyfluorinated acetal 2,2-bis(2,2,3,3,3-pentafluoropropoxy) propane, $(CH_3)_2C(OCH_2CF_2CF_3)_2$.

This acetal is cracked as described in Example 2 to produce the fluorinated vinyl ether, 2(2,2,3,3,3-pentafluoropropoxy) propene-1

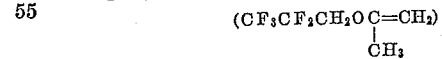

A by-product hexanal is also found.

EXAMPLE 6

The advantageous use of a decomposition inhibitor comprising a basic organic nitrogen compound containing tertiary nitrogen is shown by the following Runs A and B.

In Run A, 107 parts of bis(2,2,2-trifluoroethyl) acetal were passed over shredded domestic asbestos catalyst at 360–370° C. using the apparatus of Example 2. A yield of 62.2% of 2,2,2-trifluoroethyl vinyl ether was obtained.

In Run B, 110 parts of bis(2,2,2-trifluoroethyl) acetal mixed with 2 parts of pyridine were passed over the same bed of shredded domestic asbestos catalyst at 365–375° C. A yield of 72% of 2,2,2-trifluoroethyl vinyl ether was obtained.

Thus it is seen that the yield of product is increased by 9.8 percentage points and that an increase percentage wise of about 15.5% is obtained due to the beneficial presence of the pyridine.

Reactions between other polyfluoroalkanols and other acetylenes than those shown in the preceding examples to form acetals may be carried out as shown in Example 1. However, our invention concerns the cracking of a polyfluoroalkyl acetal of the type described in this specification regardless of the method of making the acetal. The polyfluoroalkyl acetal may be treated to introduce substituents into the acetal before subjecting the acetal to the cracking operation. Hydroxyl, cyano, halogen and other groups may thus be added. Our process is used to crack such acetals, as shown in the following examples. In each case the method of Example 2 is used. For ease in presentation, only the polyfluoroalkyl acetal, the catalyst, and the temperature and products obtained are listed.

EXAMPLE 7

$CNCH_2CH(OCH_2CF_3)_2$ + (pyridine) $\xrightarrow[300-350°\ C.]{\text{expanded vermiculite}}$ $CF_3CH_2OH + CF_3CH_2OCH=CHCN$

EXAMPLE 8

$HOCH_2CH_2CH(OCH_2CF_2CF_2CF_2CF_3)_2$ +

(tert-butylamine) $\xrightarrow[450-500°\ C.]{\text{quartz sand}}$ $CF_3CF_2CF_2CF_2CH_2OH$ +

$CF_3CF_2CF_2CF_2CH_2OCH=CHCH_2OH$

EXAMPLE 9

$ClCH_2CH_2CH(OCH(CH_3)CF_3)_2$ + (2-picoline) $\xrightarrow[250-300°\ C.]{\text{tremolite}}$ $CF_3CH(CH_3)OH + CF_3CH(CH_3)OCH=CHCH_2Cl$

EXAMPLE 10

$C_6H_5CH_2CH(OCH_2CF_2CF_3)_2$ + (dimethyl pyridine) $\xrightarrow[350-400°\ C.]{\text{muscovite}}$ $CF_3CF_2CH_2OH + CF_3CF_2CH_2OC(C_6H_5)=CH_2$

EXAMPLE 11

$C_2H_5CH_2C(C_2H_5)(OCH_2C_{11}F_{23})_2$ $\xrightarrow[350-400°\ C.]{\text{chrysotile}}$ $C_{11}F_{23}CH_2OH + (1-X)\ C_{11}F_{23}CH_2OC(C_2H_5)=CHC_2H_5$ + (X) $C_{11}F_{23}CH_2OC(CH_3)=CHC_3H_7$

EXAMPLE 12

$CH_3CH(OCH_2CH_2F)_2$ $\xrightarrow[300-350°\ C.]{\text{expanded vermiculite}}$ $CH_2FCH_2OH + CH_2FCH_2OCH=CHCH_3$

EXAMPLE 13

$FCH_2C(CN)(OCH_2CHF_2)_2$ $\xrightarrow[300-400°\ C.]{\text{expanded vermiculite}}$ $CHF_2CH_2OH + CHF_2CH_2OC(CN)=CHF$

EXAMPLE 14

$CH_3CH(C_6H_5)CH_2CH(OCH_2CFHCF_3)_2$ $\xrightarrow[400-500°\ C.]{\text{expanded vermiculite}}$ $CF_3CFHCH_2OH + CF_3CFHCH_2OCH=CH(C_6H_5)CHCH_3$

EXAMPLE 15

$CFH_2OCH_2CH(OCH_2CF_2CF_3)_2$ $\xrightarrow[400-450°\ C.]{\text{expanded vermiculite}}$ $CF_3CF_2CH_2OH + CF_3CF_2CH_2OCH=CHOCFH_2$

EXAMPLE 16

$CH_3CH_2C(C_6H_5)(OCH_2CClF_2)_2$ $\xrightarrow[400-500°\ C.]{\text{expanded vermiculite}}$ $CClF_2CH_2OH + CClF_2CH_2OC(C_6H_5)=CHCH_3$

EXAMPLE 17

$CH_3CCl(OCH_2CFClCF_3)_2$ $\xrightarrow[400-500°\ C.]{\text{expanded vermiculite}}$ $CF_3CFClCH_2OH + CF_3CFClCH_2OCCl=CH_2$

We claim:

A compound having the empirical formula $$C_{10}H_{13}F_9O_3$$

and boiling in the range 190–195° C. formed by the process which comprises reacting 2,2,2-trifluoroethanol with acetylene in the presence of a catalyst consisting of a mixture of from about 1 to about 10 parts by weight of a strong mineral acid with 1 part by weight of yellow mercuric oxide at a temperature in the range of from about 30 to about 40° C. and separating said $C_{10}H_{13}F_9O_3$ from the reaction mixture.

References Cited in the file of this patent

UNITED STATES PATENTS

| | | |
|---|---|---|
| 1,796,690 | Herrmann et al. | Mar. 17, 1931 |
| 1,824,963 | Nieuwland | Sept. 29, 1931 |
| 1,902,169 | Herrmann et al. | Mar. 21, 1933 |
| 2,482,725 | Bramwyche et al. | Sept. 20, 1949 |
| 2,732,370 | Codding | Jan. 24, 1956 |
| 2,768,174 | Paul et al. | Oct. 23, 1956 |
| 2,809,218 | Croix | Oct. 8, 1957 |
| 2,870,218 | Townsend | Jan. 20, 1959 |
| 2,872,487 | Croix | Feb. 3, 1959 |